United States Patent
Tsukahara et al.

[11] Patent Number: 6,021,107
[45] Date of Patent: Feb. 1, 2000

[54] OPTICAL PICKUP DEVICE AND RECORDING AND/OR REPRODUCING APPARATUS FOR OPTICAL DISC

[75] Inventors: Nobuhiko Tsukahara; Katsuya Takahashi, both of Kanagawa, Japan

[73] Assignee: Sony Corporation, Tokyo, Japan

[21] Appl. No.: 09/043,380

[22] PCT Filed: Jul. 17, 1997

[86] PCT No.: PCT/JP97/02490

§ 371 Date: Aug. 19, 1998

§ 102(e) Date: Aug. 19, 1998

[87] PCT Pub. No.: WO98/02874

PCT Pub. Date: Jan. 22, 1998

[30] Foreign Application Priority Data

Jul. 17, 1996 [JP] Japan .................................. P8-187772
Jul. 17, 1996 [JP] Japan .................................. P8-187773

[51] Int. Cl.$^7$ .................................................. G11B 17/30
[52] U.S. Cl. .............................................................. 369/219
[58] Field of Search ..................................... 369/219, 215

[56] References Cited

FOREIGN PATENT DOCUMENTS

| | | |
|---|---|---|
| 7-37259 | 2/1995 | Japan . |
| 8-138265 | 5/1996 | Japan . |
| 8-315409 | 11/1996 | Japan . |
| 8-329517 | 12/1996 | Japan . |
| 9-147405 | 6/1997 | Japan . |

*Primary Examiner*—Allen T. Cao
*Attorney, Agent, or Firm*—Limbach & Limbach L.L.P.

[57] ABSTRACT

An optical pick-up device used for recording and/or reproduction of at least two kinds of optical discs different in kind. This optical pick-up device comprises a first object lens, a second object lens having numerical aperture different from numerical aperture of the first object lens, a bobbin on which the first and second object lenses are attached, and a drive mechanism for moving the bobbin in a first direction in parallel to the optical axes of the first and second object lenses and in a second direction perpendicular to the optical axes of the first and second object lenses. Thus, such an approach is employed to selectively use the first and second object lenses to thereby carry out recording and/or reproduction of at least two kinds of optical discs different in kind.

28 Claims, 5 Drawing Sheets

OPTICAL PICKUP DEVICE AND RECORDING AND/OR REPRODUCING APPARATUS FOR OPTICAL DISC

TECHNICAL FIELD

This invention relates to an optical pick-up device and a recording and/or reproducing apparatus for optical disc used for carrying out recording and/or reproduction of information signals with respect to two kinds of optical discs different in kind, and more particularly to an optical pick-up device and a recording and/or reproducing apparatus for optical disc, which permit recording and/or reproduction of information signals with respect to two kinds of optical discs different in kind by selectively using first and second object lenses (objectives) attached on a single bobbin.

BACKGROUND ART

Hitherto, as recording media for information signals such as sound signals and/or video signals, and data, etc. processed at information processing equipment such as computer, etc., various kinds of optical discs have been used and have been proposed.

As the optical disc of this kind, there are used optical discs adapted for recording sound signals and/or data, etc. processed at information processing equipment such as computer, etc., and having diameter caused to be 120 mm or 80 mm and thickness caused to be 1.2 mm. Such optical discs are called Compact Disc (CD).

Moreover, there are also used video discs which are optical discs adapted for mainly recording video signals as information signal, and having diameter caused to be 300 mm or 200 mm and thickness caused to be 1.2 mm.

Further, with realization of multi-media of information signals, there has been demand for realization of wide variety and vast (gigantic) quantity of information signals such as picture data or sound data, etc. which are handled at a time. To satisfy such demand, as optical disc in which the medium itself has been miniaturized while realizing high recording density, there have been proposed optical discs in which two optical discs each having diameter caused to be 120 mm and thickness of the disc base (substrate) caused to be 0.6 mm are stuck to each other so that the entire thickness is 1.2 mm, and optical discs in which optical disc having thickness of 0.6 mm and disc reinforced plate having thickness of 0.6 mm are stuck to each other so that the entire thickness is caused to be 1.2 mm. Such optical discs are generally called Digital Video Disc (DVD).

In general, the optical disc constituted as a recording medium for information signals are adapted as shown in FIG. 1 so that non-signal recording areas 202, 203 are respectively provided at the inner circumferential side area of the outer periphery of a center hole 201 formed at the central portion and the outermost circumferential side area, and a signal recording area 204 where information signals are recorded is provided within the area encompassed by the inner circumferential side non-signal recording area 202 and the outer circumferential side non-signal recording area 203. At the inner circumferential side of the signal recording area 204, there is provided a TOC (Table of Contents) area 205 in which addresses of information signals recorded in the signal recording area and management information such as table (of contents) of recording contents, etc. are recorded. Further, in the optical disc, in the state where the innermost circumferential side position of the TOC area is caused to be read starting position of information signals, i.e., lead-in position, read operation of information signals recorded on the optical disc is started from the lead-in position. In addition, in CD 210 having diameter caused to be 120 mm, the lead-in position is set at the position where radius $R_1$ from the disc center $O_1$ is 23 mm.

In order to carry out read operation of information signals recorded on this optical disc, the optical pick-up device is caused to be moved toward the innermost circumferential side position of the optical disc. At this time, the object lens (objective) which focuses light beams emitted from the light source of the optical pick-up device to irradiate them onto the optical disc is adapted so that its optical axis is caused to be in correspondence with the lead-in position. In addition, when the lead-in position which serves as reference position of read starting of information signals is caused to undergo movement operation toward the outer circumferential side of the optical disc, the optical pick-up device scans the signal recording area of the optical disc by light beams emitted from the light source to carry out read operation of information signals.

Meanwhile, in the recording and/or reproducing apparatuses for optical disc using optical disc as recording medium, there have been proposed apparatuses adapted for reproducing, by using the same optical pick-up device, information signals recorded on optical discs of plural specifications in which their lead-in positions are different from each other.

As the recording and/or reproducing apparatus for optical disc of this kind, there are used optical disc recording and/or reproducing apparatuses capable of reproducing, with compatibility, CDs and video discs in which their lead-in positions are different from each other. In such optical disc recording and/or reproducing apparatuses, attention is drawn to the fact that diameters of the CD and the video disc are different from each other to discriminate sizes of these optical discs by the discrimination mechanism to control the lead-in position of the optical pick-up device in dependency upon its discrimination result to carry out reproduction of information signals from lead-in positions corresponding to respective optical discs.

In recording and/or reproducing apparatuses adapted to adjust (change) the lead-in position of the optical pick-up device in correspondence with the specification of the optical disc used as stated above, the movement range of the optical pick-up device is caused to be broad as compared to the size of the optical disc used. As a result, not only the apparatus itself becomes large-sized, but also feed control of the optical pick-up device becomes complicated because the reference position of the optical pick-up device is changed.

Additionally, also in CD and DVD, lead-in positions of the optical pick-up device are different from each other.

Moreover, in the recording and/or reproducing apparatuses for optical disc using optical disc as recording medium, there have been proposed apparatuses capable of using, with compatibility, optical discs in which thicknesses of their disc substrates are different from each other, e.g., CD and DVD, and CD, DVD and video disc. When the thickness of the optical disc is different, the distance from the object lens up to the signal recording surface of the optical disc would be varied. In order to use, with compatibility, optical discs of plural specifications in which their thicknesses are different from each other, plural object lenses (objectives) having focal lengths (distances) different from each other are required.

In optical pick-up devices provided with plural object lenses, plural object lens are caused to undergo rotational operation so that every time each of optical discs different in thickness is loaded, the optical axis of object lense corresponding to each optical disc is positioned on the center line of the loaded optical disc. However, when the mechanism for allowing the object lenses to undergo rotational operation is provided, the optical pick-up device becomes large-sized. When the optical pick-up device becomes large-sized, the feed mechanism of the optical pick-up device also becomes large-sized. As a result, the optical disc recording and/or reproducing apparatus itself also becomes large-sized.

Moreover, in optical pick-up devices used in optical disc recording and/or reproducing apparatuses capable of using, with compatibility, optical discs in which thicknesses of their disc bases are different from each other, there have been also proposed optical pick-up devices in which single object lens is used to adjust (vary), in dependency upon thickness of the optical disc to be loaded, distance of the object lens with respect to the optical disc, i.e., the reference height position with respect to the optical disc of the object lens. However, in order to change the reference height position of the object lens, the mechanism for allowing the object lens to undergo adjustable driving in the optical axis direction thereof becomes complicated. In addition, the mechanism for displacably supporting the object lens in the optical axis direction thereof becomes complicated.

DISCLOSURE OF THE INVENTION

An object of this invention is to provide a novel optical pick-up device used for recording and/or reproduction of plural optical discs different in size.

Another object of this invention is to provide a novel optical pick-up device and a recording and/or reproducing apparatus for optical disc used for recording and/or reproduction of plural optical discs different in thickness.

A further object of this invention is to provide an optical pick-up device and a recording and/or reproducing apparatus for optical disc, which realize miniaturization and light weight of the entirety of the device and the apparatus.

A still further object of this invention is to provide an optical pick-up device and a recording and/or reproducing apparatus for optical disc, which can easily carry out feed control to the reference position with respect to the optical disc, and can simplify the mechanism for carrying out feed control.

An optical pick-up device for recording and/or reproduction of optical disc, which is proposed in order to attain such objects, comprises a first object lens and a second object lens, wherein the first and second object lenses are attached on a bobbin in such a manner that respective optical axes are in parallel to each other, and that either one of the first and second object lenses is positioned on line passing through the center of the optical disc. The bobbin on which the first and second object lenses are attached is moved, by a drive mechanism, in a first direction in parallel to the optical axes of the first and second object lenses and in a second direction perpendicular to the optical axes of the first and second object lenses.

The object lens disposed on the line passing through the center of the optical disc of the first and second object lenses is attached on the bobbin so that when this object lens is positioned at the innermost circumference of the optical disc, it is located at a read starting position of the optical disc, whereby switching of at least the object lens is not required for the optical disc where the first object lens is used (applied).

Moreover, the first and second object lenses are attached on the bobbin in such a manner that when one object lens disposed on the line passing through the center of the optical disc thereof is located at the read starting position of one optical disc, the other object lens is located at the read starting position of the other optical disc, whereby the read starting position is fixed also with respect to either optical disc. Thus, movement control to the read starting position is facilitated.

Further, the first and second object lenses are attached on the bobbin along the tangential line direction of tracks of the optical disc, thereby making it possible to precisely carry out correct tracking control with respect to either optical disc.

The drive mechanism for moving the bobbin in the first direction in parallel to the optical axes of the first and second object lenses and in the second direction perpendicular to the optical axes of the first and second object lenses is of a structure comprising at least one elastic supporting member for movably supporting the bobbin in the first and second directions, a fixed portion on which the end portion of the elastic supporting member is attached, plural coils provided at either one of the bobbin and the fixed portion, and at least one magnet provided at the other and opposite to the plural coils, thus making it possible to move, by simple configuration, the first and second object lenses in the direction in parallel to the optical axes thereof and in the direction perpendicular to the optical axes thereof.

The optical pick-up device according to this invention further comprises a first light source, a first optical system for guiding light beams from the first light source to the first object lens, a second light source for emitting light beams having wavelength different from wavelength of light beams emitted from the first light source, and a second optical system for guiding light beams from the second light source to the second object lens, thus making it possible to carry out recording and/or reproduction of information signals with respect to plural kinds of optical discs different in recording density.

Further, since the numerical aperture of the first object lens and the numerical aperture of the second object lens are different from each other, it is possible to carry out recording and/or reproduction of information signals with respect to plural kinds of optical discs different in distance from the object lens.

Furthermore, the first and second object lenses are attached on the bobbin so that they are respectively positioned on line passing through the center of the optical disc, thus permitting the optical axis of the object lens to be positioned on line passing through the center of the optical disc even with respect to plural kinds of optical discs different in the specification. As a result, it is possible to carry out recording and/or reproduction of information signals, with satisfactory recording/reproduction characteristic, also with respect to either optical disc.

Further, an optical pick-up device according to this invention used in recording and/or reproduction of at least two kinds of optical discs different in kind comprises a first object lens, a second object lens having numerical aperture different from numerical aperture of the first object lens, a bobbin attached in such a manner that respective optical axes of the first and second object lenses are in parallel to each other, and at least one of the first and second object lenses is located at the recording starting position of the optical disc when the optical pick-up device is positioned at the innermost circumference of the optical disc, and a drive mechanism for moving the bobbin in a first direction in parallel to the optical axes of the first and second object lenses and in a second direction perpendicular to the optical axes.

Further, an optical pick-up device according to this invention used in recording and/or reproduction of at least two kinds of optical discs having thicknesses different from each other comprises a first object lens for irradiating light beams from a first light source onto either one of two kinds of optical discs, a second object lens for irradiating light beams from a second light source onto the other of the two kinds of optical discs, a bobbin attached in such a manner that respective optical axes of the first and second object lenses are in parallel to each other and either one of the first and second object lenses is disposed on line passing through the center of the optical disc, and a drive mechanism for moving the bobbin in a first direction in parallel to the optical axes of the first and second object lenses and in a second direction perpendicular to the optical axes of the first and second object lenses.

Furthermore, a recording and/or reproducing apparatus for optical disc according to this invention for carrying out recording and/or reproduction of at least two kinds of optical discs having thicknesses different from each other comprises an optical pick-up device comprising a first object lens for irradiating light beams from a first light source onto either one of two kinds of optical discs, a second object lens for irradiating light beams from a second light source onto either the other of the two kinds of optical discs, a bobbin attached in such a manner that respective optical axes of the first and second object lenses are in parallel to each other and either one of the first and second object lenses is positioned on line passing through the center of the optical disc, and a drive mechanism for moving the bobbin in a first direction in parallel to the optical axes of the first and second object lenses and in a second direction perpendicular to the optical axes, and further comprises a discrimination mechanism for discriminating kind of optical disc loaded within the recording and/or reproducing apparatus to carry out switching between the first light source and the second light source on the basis of the discrimination result, thus to switch the light source used in dependency upon kind of optical disc loaded.

Still more further objects of this invention and more practical merits obtained by this invention will become more clear from the description of embodiments which will be given below.

BEST MODE FOR CARRYING OUT THE INVENTION

An optical pick-up device and a recording and/or reproducing apparatus for optical disc according to this invention will now be described with reference to the attached drawings.

A first embodiment of the optical pick-up device and the optical disc recording and/or reproducing apparatus using such optical pick-up device according to this invention will be described below.

The optical pick-up device disclosed here is used for recording and/or reproduction of Compact Disc (CD) which is a first optical disc 210 having diameter caused to be 120 mm and thickness caused to be 1.2 mm, and adapted so that sound signals are mainly recorded, and Digital Video Disc (DVD) which is a second optical disc 211 in which two optical discs each having diameter caused to be 120 mm and the thickness of the disc base caused to be 0.6 mm are stuck to each other so that the entire thickness is caused to be 1.2 mm, and adapted so that information signals such as video signals, etc. are mainly recorded at higher density as compared to the first optical disc 210.

Figure 1:
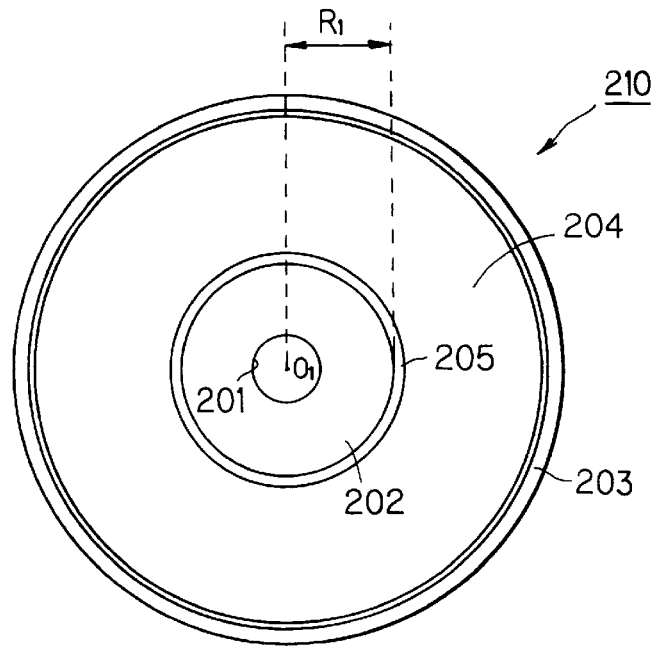
FIG. 1 is a plan view showing signal recording area and recording starting position of information signal of optical disc used in (applied to) an optical pick-up device according to this invention.

In the CD in which the optical pick-up device according to this invention is used (applied), i.e., the first optical disc 210, as previously mentioned FIG. 1, the lead-in position which is the read starting position of information signals is set to the position where radius $R_1$ from the disc center $O_1$ is 23 mm. Moreover, in the DVD in which the optical pick-up device according to this invention is used (applied), i.e., the second optical disc 211, the lead-in position is set to the position where radius $R_1$ from the disc center $O_1$ is 22.6 mm. Namely, this optical pick-up device 1 is used for recording and/or reproduction of information signals with respect to the first optical disc 210 and the second optical disc 211 in which their lead-in positions are different from each other.

Figure 2:
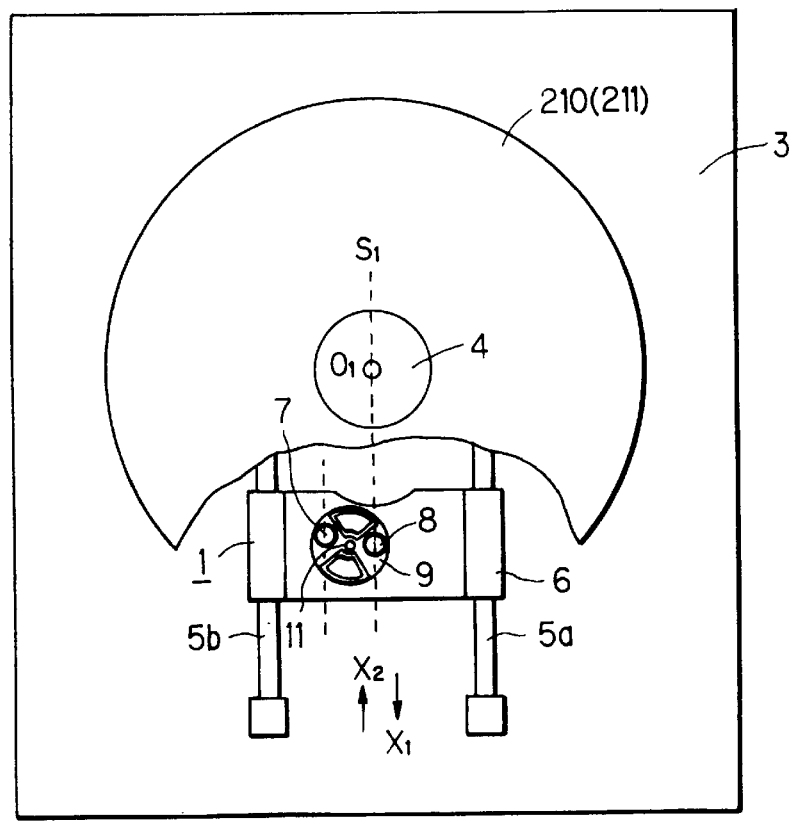
FIG. 2 is a plan view showing an optical pick-up device according to a first embodiment of this invention and an optical disc recording and/or reproducing apparatus using this optical pick-up device.

The optical pick-up device 1 of the first embodiment is used, e.g., in the optical disc recording and/or reproducing apparatus using the above-described first and second optical discs 210, 211 as recording medium, and is disposed as shown in FIG. 2 within the optical disc recording and/or reproducing apparatus through a base 3 constituting the apparatus body. On this base 3, the first or second optical disc 210 or 211 is loaded, and a disc rotational operation mechanism composed of a disc table 4 for allowing these optical discs 210, 211 to selectively undergo rotational operation and spindle motor for allowing this disc table 4 to undergo rotational drive is disposed. The spindle motor constituting this disc rotational operation mechanism is attached at the lower surface side of the base 3.

Moreover, on the base 3, a guide shaft 5a and a drive shaft 5b are disposed in parallel to each other in such a manner that the disc table 4 is put therebetween. The optical pick-up device 1 is movably supported in the radial direction of the first or second optical disc 210 or 211 loaded on the disc table 4 by allowing both ends of an optical block 6 including therewithin light detector (photo-detector) for detecting light beams from semiconductor laser serving as light source or light beams reflected from the first or second optical disc 210, 211 to carry out read operation of information signals recorded on these optical discs 210, 211 and optical parts such as beam splitter, etc. to be supported by the guide shaft 5a and the drive shaft 5b. Further, the optical pick-up device 1 is adapted so that the drive shaft 5b is caused to undergo rotational drive by feed motor (not shown), whereby it is caused to undergo feed operation in a direction indicated by arrow $X_1$ and in a direction indicated by arrow $X_2$ in FIG. 2 which are tracking direction extended in (along) the radial direction of the first or second optical disc 210, 211 loaded on the disc table 4 while being guided by the guide shaft 5a.

In this example, in the case where the optical pick-up device 1 carries out read-out operation of information signals recorded on the first or second optical disc 210, 211, it is caused to undergo feed operation in the direction indicated by arrow $X_1$ in FIG. 2 from the lead-in position provided at the inner circumferential side of the first or second optical disc 210, 211 toward the outer circumferential side of the first or second optical disc 210, 211.

Figure 3:
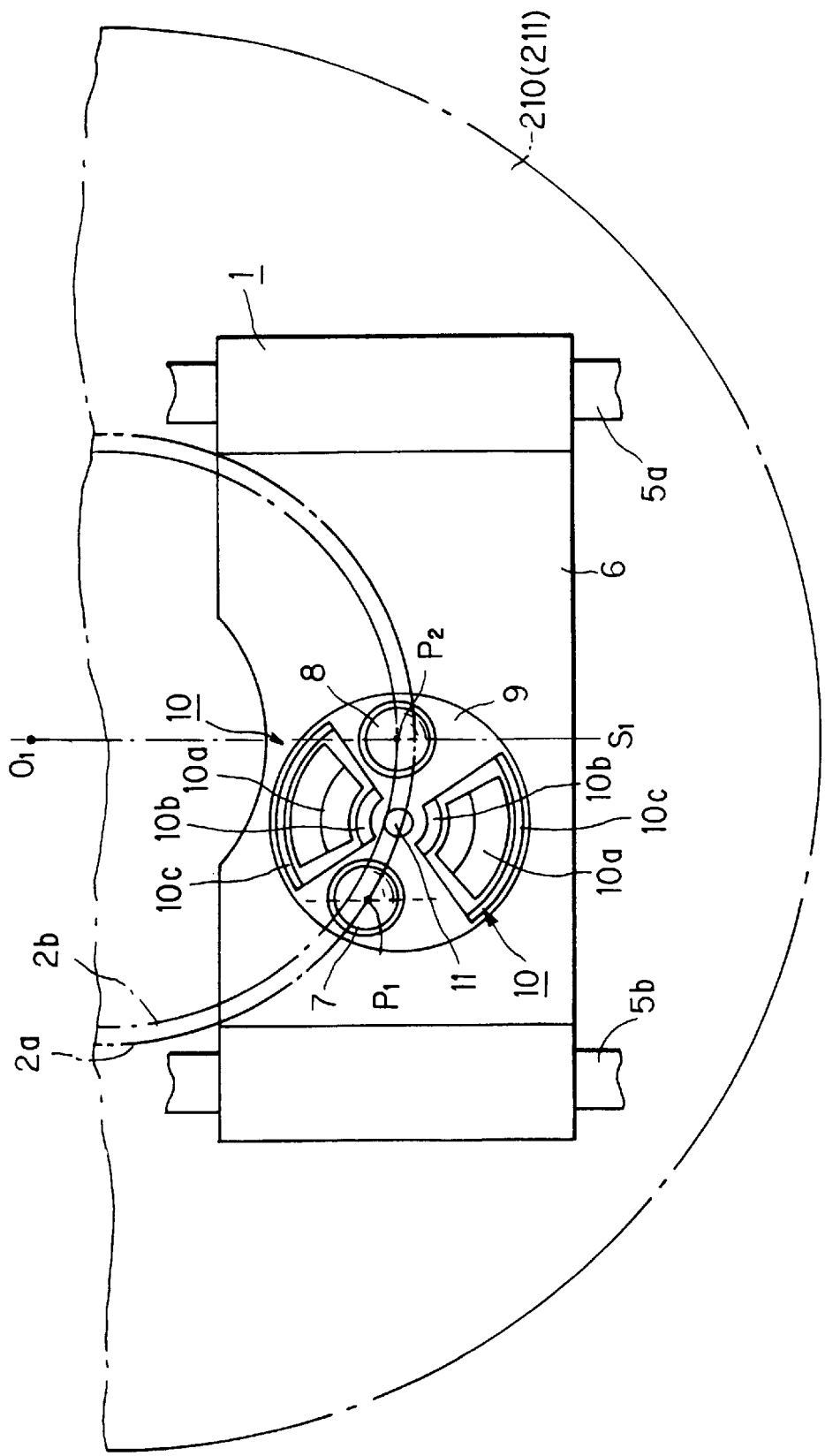
FIG. 3 is a plan view showing the optical pick-up device according to the first embodiment of this invention.
Figure 4:
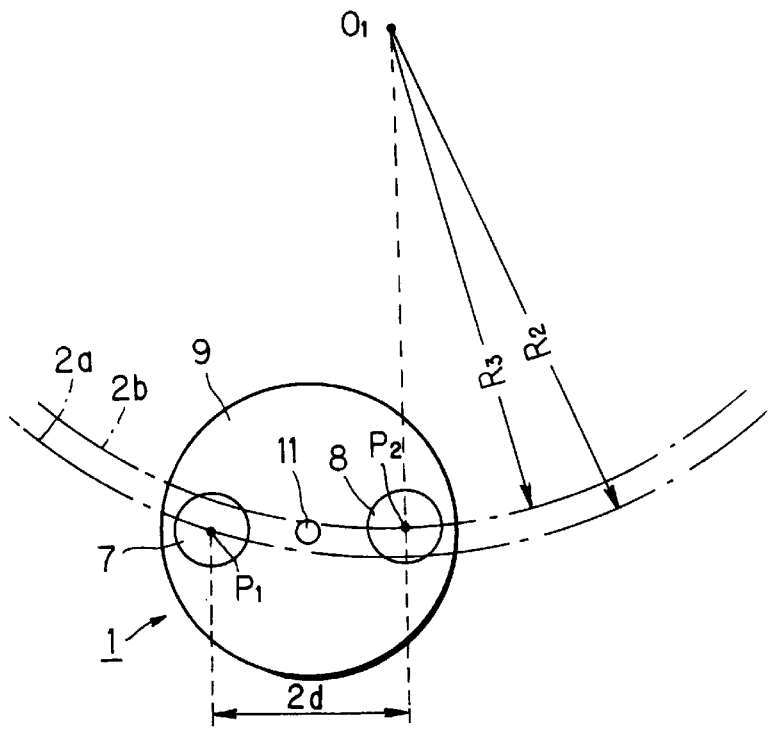
FIG. 4 is a plan view showing positions (positional relationship) with respect to first and second optical discs of optical axes of first and second object lenses constituting the optical pick-up device.

This optical pick-up device 1 comprises, as shown in FIGS. 2 and 3, a first object lens (objective) 7 used at the time of reading out information signals recorded on the first optical disc 210, a second object lens (objective) 8 used at the time of reading out information signals recorded on the second optical disc 211, and a bobbin 9 on which these first and second object lenses 7, 8 are attached. The first and second object lenses 7, 8 are attached on the bobbin 9 so that respective optical axes are in parallel to each other. Moreover, at the optical pick-up 1, there is provided an electromagnetic drive mechanism 10 for moving the bobbin 9 in the focusing direction which is the first direction in parallel to the optical axes of the first and second object lenses 7, 8 and in the tracking direction which is the second direction perpendicular to the optical axes of the first and second object lenses 7, 8.

Further, the first object lens 7 is attached on the bobbin 9 in such a manner that when the optical pick-up device 1 is moved to the innermost circumferential side position with respect to the first or second optical disc 210, 211, the optical axis $P_1$ is located at lead-in position 2a which is the read starting position of the first optical disc 210 as shown in FIG. 3. Further, the second object lens 8 is attached on the bobbin 9 in such a manner that when the optical pick-up device 1 is moved to the inner most circumferential side position with respect to the first or second optical disc 210 or 211, the optical axis $P_2$ is located at lead-in position 2b of the second optical disc 211 as shown in FIG. 3. Furthermore, the second object lens 8 is attached on the bobbin 9 in such a manner that it is located on the center line $S_1$ passing through the rotation center $O_1$ of the second optical disc 211 loaded on the disc table 4. In addition, the first object lens 7 and the second object lens 8 are disposed at positions symmetrical with a support shaft 11 for supporting this bobbin 9 which serves as center of rotation of the bobbin 9 being as center.

Meanwhile, the bobbin 9 on which the first and second object lenses 7, 8 are attached is formed substantially cylindrical so that it includes top plate, and is adapted so that the central portion thereof is supported by the support shaft 11. In addition, the bobbin 9 is permitted to be slid in the axial direction of the support shaft 11 and is rotatably supported in the direction around the axis of the support shaft 11. In this example, the bobbin 9 is held so that it is placed at the neutral position by the neutral point supporting mechanism constituted by rubber having elasticity, or the like.

The bobbin 9 is caused to undergo drive displacement by the electromagnetic drive mechanism 10, whereby it is slid in the axial direction of the support shaft 11 and is further rotated in the direction around the axis of the support shaft 11. Namely, the bobbin 9 is caused to undergo slide displacement in the axial direction of the support shaft 11, whereby the first and second object lenses 7, 8 are caused to undergo drive displacement in the first direction in parallel to their optical axes so that focusing control with respect to the first or second optical disc 210, 211 is carried out. As a result, the bobbin 9 is caused to undergo rotational displacement in the direction around the axis of the support shaft 11. Thus, the first and second object lenses 7, 8 are caused to undergo drive displacement in the second direction perpendicular to their optical axes so that tracking control with respect to the first or second optical disc 210 or 211 is carried out.

The electromagnetic drive mechanism 10 for allowing the bobbin 9 to undergo drive displacement is composed, as shown in FIG. 3, of a magnet for focusing and a yoke for focusing, and a magnet for tracking and a yoke for tracking which form a magnetic circuit 10a, and a coil 10b for focusing and a coil 10c for tracking, whereby when focus error signal is delivered to the focusing coil 10b, the electromagnetic drive mechanism 10 allows the bobbin 9 to undergo drive displacement, and when tracking error signal is delivered to the tracking coil 10c, it allows the bobbin 9 to undergo rotational displacement in the direction around the axis of the support shaft 11.

Moreover, on the base 3, there is provided, although not shown, in a manner adjacent to the disc table 4, initial position detecting switch for detecting that the optical pick-up device 1 has been moved to the initial position. This initial position detecting switch is adapted so that each of optical axes $P_1$, $P_2$ of the first and second object lenses 7, 8 of the optical pick-up device 1 is moved up to the innermost circumferential side where it is located at lead-in position 2a or 2b of the first or second optical disc 210 or 211 loaded on the disc table 4, the initial position detecting switch is caused to undergo pressing operation by a portion of the optical pick-up device 1 to detect that the optical pick-up device 1 has reached the read-out starting position of the first or second optical disc 210 or 211.

In the case where the reproduction mode is selected in the optical disc recording and/or reproducing apparatus, when the optical pick-up device 1 is caused to undergo feed operation in the direction indicated by arrow $X_2$ in FIG. 2 and it is detected by the initial position detecting switch that it has been made to the initial position, the feed operation in the direction indicated by arrow $X_2$ in FIG. 2 is once stopped. Following this stop, the feed motor is driven in the forward rotation direction so that the optical pick-up device 1 is caused to undergo constant speed (velocity) feed in the direction indicated by arrow $X_1$ in FIG. 2. As a result, read-out operation of information signals recorded on the first or second optical disc 210 or 211 is carried out. Thus, those information signals are reproduced.

In accordance with the optical disc recording and/or reproducing apparatus using the optical pick-up device 1 according to this invention, since it is possible to respectively detect, without necessity to respectively initial position detecting switches in correspondence with the first and second object lenses 7, 8, respective lead-in position 2a, 2b of the first or second optical disc 210 or 211 of the first and second object lenses 7, 8 by the single initial position detecting switch, the number of parts can be reduced.

The first object lens 7 and the second object lens 8 disposed at the above-described optical pick-up device 1 are attached on the bobbin 9 so that respective optical axes $P_1$, $P_2$ are located at respective lead-in positions 2a, 2b of the first and second optical discs 210, 211. In the case where positions of the first object lens 7 and the second object lens 8 are set in order to become in correspondence with the first optical disc 210 and the second optical disc 211 in which distances from the rotation center $O_1$ up to the lead-in positions 2a, 2b are different from each other as stated above, when distance from the rotation center $O_1$ up to the lead-in position 2a of the first optical disc 210 is assumed to be $R_1$ mm and distance from the rotation center $O_1$ up to the lead-in position 2b of the second optical disc 211 is assumed to be $R_2$ mm, if distance between respective optical axes $P_1$, $P_2$ of the first object lens 7 and the second object lens 8 is 2d mm, $$R_2^2 = R_1^2 + (2d)^2 \tag{1}$$

d is selected so as to satisfy the above-mentioned equation (1), whereby when the optical pick-up device 1 has reached the read starting position of information signals of the innermost circumferential side, respective optical axes $P_1$, $P_2$ of the first and second object lenses 7, 8 can be positioned in correspondence with respective lead-in positions 2a, 2b of the first and second optical discs 210, 211.

Moreover, while the second object lens 8 is set so that its optical axis $P_2$ is located at the lead-in position 2b of the second optical disc 211 in the state where the optical axis $P_1$ of the first object lens 7 is located at the lead-in position 2a of the first optical disc 210, setting may be made such that its optical axis $P_2$ is located at any other lead-in position within TOC (Table of Contents) provided at the inner circumferential side of the second optical disc 211 similarly to the first object lens 7 as occasion demands.

The operation for reproducing information signals recorded on the first or second optical disc 210 or 211 by using the optical disc recording and/or reproducing apparatus provided with the optical pick-up device 1 constituted as described above will now be described.

Initially, in the case of reproducing the first optical disc 210, the feed motor is driven to allow the optical pick-up device 1 to undergo feed operation toward the inner circumferential side of the first optical disc 210 in the direction indicated by arrow $X_2$ in FIG. 2. When the optical pick-up device 1 is caused to undergo feed operation in the direction indicated by arrow $X_2$ in FIG. 2 and the initial position detecting switch is caused to undergo pressing operation by the optical pick-up device 1, it is detected that the optical axis $P_1$ of the first object lens 7 is located at the lead-in position 2a of the first optical disc 210. Thus, drive of the feed motor is once stopped. Following stop of this feed motor, the feed motor is driven in the forward rotation direction. As a result, the optical pick-up device 1 is caused to undergo feed operation in the direction indicated by arrow $X_1$ in FIG. 2 toward the outer circumferential side of the first optical disc 210 to scan the signal recording area of the first optical disc 210 by light beams emitted from the optical pick-up device 1 and focused by the first object lens 7 to detect return light beams reflected from the first optical disc 210 by light detector within the optical pick-up device. Thus, reproduction of information signals recorded on the first optical disc 210 is carried out.

Moreover, also in the case of reproducing the second optical disc 211, the feed motor is driven to allow the optical pick-up device 1 to undergo feed operation toward the inner circumferential side of the second optical disc 211 in the direction indicated by arrow $X_2$ in FIG. 2 until the optical pick-up device 1 pushes the initial position detecting switch to once stop drive operation of the feed motor when the optical axis $P_2$ of the second object lens 8 is located at the lead-in position 2b of the second optical disc 211. Following stop of the feed motor, this feed motor is driven in the forward rotation direction to allow the optical pick-up device 1 to undergo feed operation in the direction indicated by arrow $X_1$ in FIG. 2 toward the outer circumferential side of the second optical disc 211. At this time, the signal recording area of the second optical disc 211 is scanned by light beams emitted from the optical pick-up device 1 and focused by the second object lens 8 to detect return light beams reflected from the second optical disc 211 by light detector within the optical pick-up device. Thus, reproduction of information signals recorded on the second optical disc 211 is carried out.

As described above, since the optical pick-up device 1 of the first embodiment is attached on the bobbin 9 so that when the optical pick-up device 1 is positioned at the innermost circumferential side of the first or second optical disc 210 or 211, the optical axis $P_1$ of the first object lens 7 is located at the lead-in position 2a of the first optical disc 210 and the optical axis $P_2$ of the second object lens 8 is located at the lead-in position 2b of the second optical disc 211, the optical pick-up device 1 can detect lead-in positions 2a, 2b at the same position with respect to two kinds of first and second optical discs 210, 211 different in the specification where lead-in positions 2a, 2b are different from each other. For this reason, movement control to the information signal read starting position of the optical pick-up device 1 is facilitated. As a result, various parts such as initial position detecting switch, etc. can be reduced. Thus, the manufacturing cost can be reduced.

Moreover, since this optical pick-up device 1 is attached on the bobbin 9 so that the optical axis $P_1$ of the first object lens 7 is located at the lead-in position 2a of the first optical disc 210 and the optical axis $P_2$ of the second object lens 8 is located at the lead-in position 2b of the second optical disc 211, when read operation of information signals respectively recorded on the two kinds of first and second optical discs 210, 211 different in the specification where lead-in positions 2a, 2b are different from each other is started, the first and second object lenses 7, 8 are caused to undergo drive displacement by the same electromagnetic drive mechanism 10 in the state where switching between reference positions is not carried. For this reason, the mechanism for carrying out the focusing control and the tracking control of the first and second object lenses 7, 8 can be simplified. Thus, miniaturization and light weight of the optical pick-up device 1 itself can be realized.

Further, since the above-described optical pick-up device 1 uses the object lens drive unit of the so-called shaft slide rotatable type, the first and second object lenses 7, 8 can be arranged in a well-balanced manner with the support shaft 11 being as center. For this reason, this object lens arrangement can also function as the so-called counter balance in which one object lens serves as weight for balance of the other object lens. Accordingly, it becomes unnecessary to provide counter balance with respect to the first and second object lenses 7, 8. Thus, miniaturization and light weight of the entirety of the device can be realized.

Further, since the second object lens 8 moving on the line $S_1$ passing through the rotation center $O_1$ of the second optical disc 211 is adapted so that inclination of recording tracks is not changed in dependency upon position of the optical pick-up device 1, there results less displacement quantity of the second object lens 8 with respect to the tangential direction of the second optical disc 211. Accordingly, this second object lens 8 is not caused to undergo restriction in setting detection method for information signal. As a result, the degree of freedom of setting is great.

It is to be noted that while the above-described optical pick-up device 1 is constituted so that the bobbin 9 on which the first and second object lenses 7, 8 are attached is rotated with the support shaft 11 being as center, there may be also employed a configuration such that the bobbin 9 is supported at the front end sides of plural elastic supporting members in linear form of which base end sides are supported at the fixed portion so that the first and second object lenses 7, 8 attached on the bobbin 9 are caused to undergo drive displacement in a direction in parallel to their optical axes and in a direction perpendicular to the optical axes.

Moreover, while the optical pick-up device 1 according to the first embodiment is set so that when it is moved to the read starting position of information signal, respective optical axes $P_1$, $P_2$ of the first and second object lenses 7, 8 are in correspondence with respective lead-in positions of CD and DVD, it is a matter of course that the optical pick-up device 1 may be set in correspondence with other optical disc, e.g., video disc, etc. In addition, the optical pick-up device 1 may be of structure in which third object lens corresponding to third optical disc is provided as occasion demands.

In this example, as the first and second object lenses 7, 8 used in the optical pick-up device 1, there is used object lenses having numerical aperture NA in conformity with the recording density of the first and second optical discs 210, 211. As the second object lens 8 used for recording and/or reproduction of the second optical disc 211 in which high density recording of information signals has been realized, there is used object lens having great numerical aperture NA as compared to the first object lens 7.

The second embodiment of the optical pick-up device according to this invention and an optical disc player using such optical pick-up device will now be described.

Similarly to the previously described optical pick-up device 1 of the first embodiment, optical pick-up device 21 disclosed here is also used for recording and/or reproduction of Compact Disc (CD) which is the first optical disc having diameter caused to be 120 mm and thickness caused to be 1.2 mm and adapted so that sound signals are mainly recorded, and Digital Video Disc (DVD) which is the second optical disc 211 in which two optical discs each having diameter caused to be 120 mm and thickness of the disc substrate caused to be 0.6 mm are stuck together so that the entire thickness becomes equal to 1.2 mm and adapted so that information signals such as video signals, etc. are mainly recorded at higher density as compared to the first optical disc 210.

Figure 5:
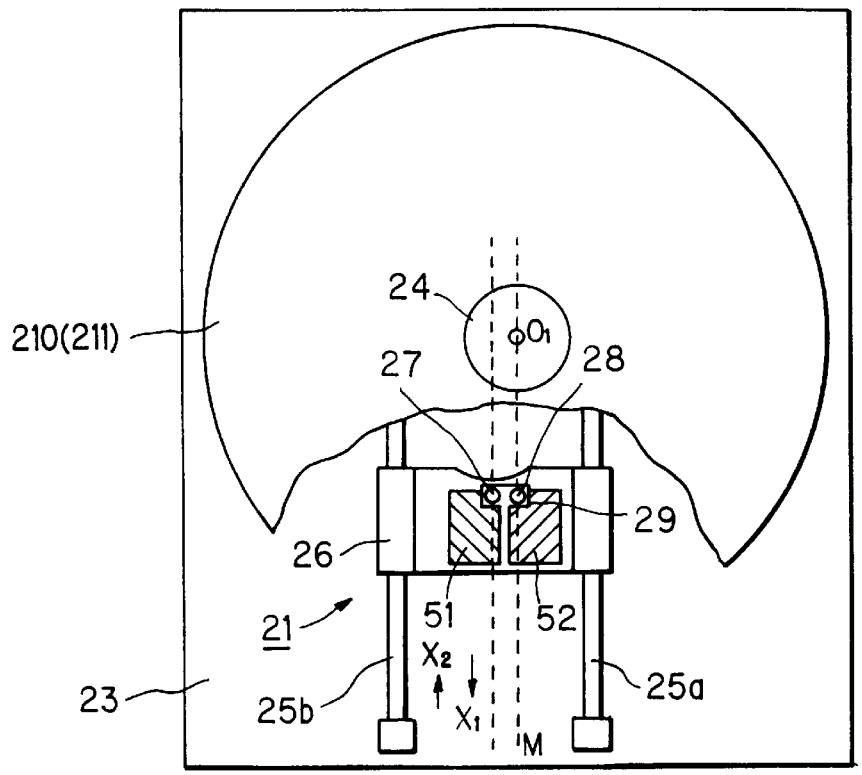
FIG. 5 is a plan view showing an optical pick-up device according to a second embodiment of this invention and an optical disc recording and/or reproducing apparatus using this optical pick-up device.

The optical pick-up device 21 of the second embodiment is used in, e.g., optical disc recording and/or reproducing apparatus using the above-described first and second optical discs 210, 211 as recording medium, and is disposed within the optical disc recording and/or reproducing apparatus through a base 23 constituting the apparatus body as shown in FIG. 5. On this base 23, the first or second optical disc 210 or 211 is loaded, and a disc rotational operation mechanism composed of a disc table 24 for allowing these optical discs 210, 211 to selectively undergo rotational operation and spindle motor for rotationally driving this disc table 24 is disposed. The spindle motor constituting this disc rotational operation mechanism is attached at the lower surface side of the base 23.

Moreover, on the base 23, a guide shaft 25a and a drive shaft 25b are disposed in parallel to each other in the state where the disc table 24 is put therebetween. The optical pick-up device 21 is movably supported in the radial direction of the first or second optical disc 210 or 211 loaded on a disc table 24 by allowing both ends of an optical block 26 including therewithin light detector for detecting light beams from semiconductor laser serving as a light source or light beams reflected from the first or second optical disc 210 or 211 to carry out read operation of information signals recorded on these optical discs 210, 211 and optical parts such as beam splitter, etc. to be supported by the guide shaft 25a and the drive shaft 25b. Further, the optical pick-up device 21 is adapted so that when the drive shaft 25b is rotationally driven by feed motor (not shown), it is caused to undergo feed operation in the direction indicated by arrow $X_1$ and in the direction indicated by arrow $X_2$ in FIG. 5 which are tracking direction extended in (along) the radial direction of the first or second optical disc 210 or 211 loaded on the disc table 24 while being guided by the guide shaft 25a.

In this example, the optical pick-up device 21 is adapted so that in the case of carrying out read-out operation of information signals recorded on the first or second optical disc 210, 211, it is caused to undergo feed operation in the direction indicated by arrow $X_1$ in FIG. 5 toward the outer circumferential side of the first or second optical disc 210 or 211 from the lead-in position provided at the inner circumferential side of the first or second optical disc 210 or 211.

Figure 6:
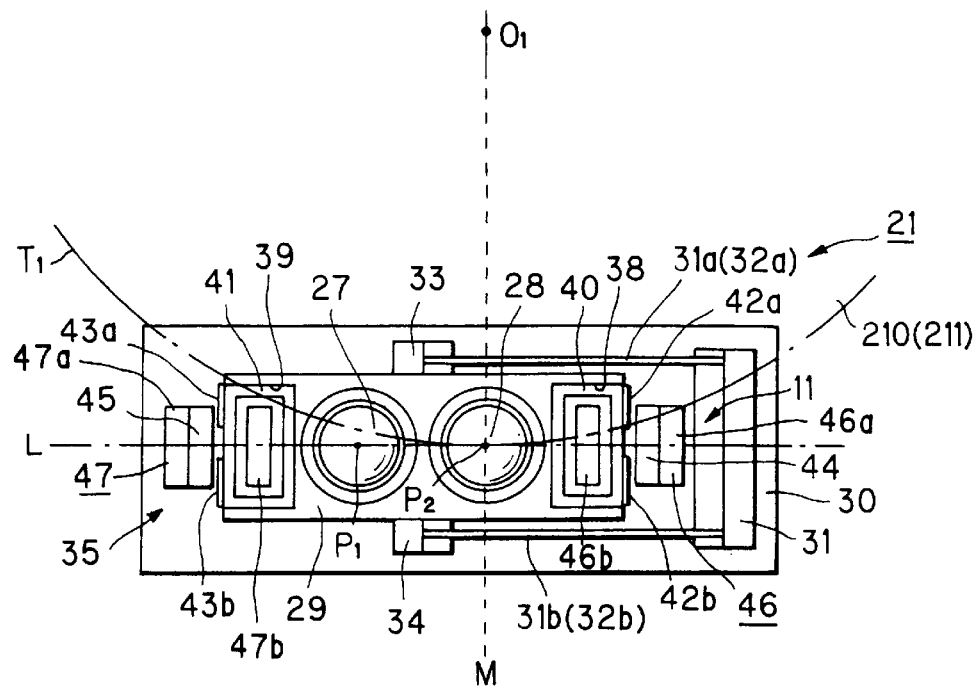
FIG. 6 is a plan view showing the optical pick-up device according to the second embodiment of this invention.

This optical pick-up device 21 comprises, as shown in FIGS. 5 and 6, a first object lens 27 used at the time of reading out information signals recorded on the first optical disc 210, a second object lens 28 used at the time of reading out information signals recorded on the second optical disc 211, and a bobbin 29 on which these first and second object lenses 27, 28 are attached. The first and second object lenses 27, 28 are attached on the bobbin 29 so that respective optical axes are in parallel to each other.

As shown in FIG. 6, this bobbin 29 is formed so as to take rectangular shape, and is adapted so that the first and second object lenses 27, 28 are attached thereon in parallel in the length direction. The bobbin 29 is adapted so that its bottom end portion is fixed on a fixed portion 31 provided on a supporting pedestal (base) 30 attached on the optical block 26, and both sides opposite to each other in the length direction thereof are supported by plural elastic supporting members 31a, 31b and 32a, 32b which take linear form, extended in the direction substantially perpendicular to the optical axes of the first and second object lenses 27, 28, whereby the bobbin 29 is movably supported in the focusing direction which is the first direction in parallel to the optical axes of the first and second object lenses 27, 28 and in the tracking direction which is the second direction perpendicular to the optical axes of the first and second object lenses 27, 28.

The plural elastic supporting members 31a, 31b and 32a, 32b for movably supporting the bobbin 29 are formed by metallic material in a linear form having elasticity such as phosphor bronze, etc. Further, as shown in FIG. 6, the bobbin 29 is adapted so that front end portions of the elastic supporting members 31a, 31b and 32a, 32b are fixed with respect to supporting projections 33, 34 provided in a projected manner (hereinafter simply referred to as "projected" as occasion may demand) at both sides opposite to each other in the length direction where the first and second object lenses 27, 28 are juxtaposed, whereby the bobbin 29 is movably supported in the focusing direction of the direction in parallel to the optical axes of the first and second object lenses 27, 28 and in the tracking direction of the direction perpendicular to the optical axes of the first and second object lenses 27, 28.

Further, the bobbin 29 cantilever-supported by the elastic supporting members 31a, 31b and 32a, 32b of which base end portions are fixed on the fixed portion 31 are caused to undergo drive displacement in the focusing direction of the direction in parallel to the optical axes of the first and second object lenses 27, 28 and in the tracking direction of the direction perpendicular to the optical axes of the first and second object lenses 27, 28 by an electromagnetic drive mechanism 35.

Namely, by the elastic supporting members 31a, 31b and 32a, 32b which support the bobbin 29 and the electromagnetic drive mechanism 35, the drive mechanism for allowing the first and second object lenses 27, 28 to undergo drive displacement in two directions of the focusing direction and the tracking direction perpendicular to each other is constituted.

As shown in FIG. 6, the electromagnetic drive mechanism 35 which constitutes the drive mechanism for the first and second object lenses 27, 28 comprises drive coils 40, 41 for focusing wound so as to take rectangular tubular shape, which are respectively attached at opening portions 38, 39 formed at both sides opposite to each other in the length direction of the bobbin 29, drive coils 42a, 42b and 43a, 43b for tracking wound so as to take flat plate rectangular shape, which are attached by respective one pairs at one side surface of these focusing drive coils 40, 41, a pair of magnets 44, 45 disposed in a manner opposite to these coils 40, 41, 42a, 42b, 43a, 43b, and yokes 46, 47 so as to take U-shape, which support these magnets 44, 45. These yokes 46, 47 are formed by raising a portion of the fixed portion 31 consisting of magnetic material. Further, as shown in FIG. 6, the respective magnets 44, 45 are attached, by using adhesive agent, etc. at the surface side opposite to the focusing drive coils 40, 41 and the tracking drive coils 42a, 42b and 43a, 43b of one pieces 46a, 47a of the respective yokes 46, 47. In this example, other pieces 46b, 47b of the respective yokes 46, 47 are inserted into the focusing drive coils 40, 41 to take tubular shape, which are attached on the bobbin 29, and are opposed to the magnets 44, 45.

When drive current corresponding to focusing error signal is delivered to the focusing drive coils 40, 41 of the electromagnetic drive mechanism 35 having such configuration, the bobbin 29 is caused to undergo drive displacement in the direction in parallel to the optical axes of the first and second object lenses 27, 28 by action of this drive current and magnetic flux from the magnets 44, 45. Thus, focusing control of the first and second object lenses 27, 28 is carried out. Moreover, when drive current corresponding to tracking error signal is delivered to the tracking drive coils 42a, 42b and 43a, 43b, the bobbin 29 is caused to undergo drive displacement in the direction perpendicular to the optical axes of the first and second object lenses 27, 28 by action of this drive current and magnetic flux from the magnets 44, 45. Thus, tracking control of the first and second object lenses 27, 28 is carried out.

Further, within the optical block 26 of the optical pick-up device 21, there are included first semiconductor laser serving as a first light source to emit first light beams, which is used for carrying out recording and/or reproduction of the first optical disc 210, and second semiconductor laser serving as a second light source to emit second light beams, which is used for carrying out recording and/or reproduction of the second optical disc 211 in which high density recording of information signals has been realized.

In this case, as the first semiconductor laser, there is used semiconductor laser adapted for emitting light beams having wavelength of 780±10 nm. As the second semiconductor laser, there is provided semiconductor laser adapted for emitting light beams having wavelength of 680 nm or less.

Within the optical block 26, there are provided a first optical system 51 for guiding first light beams emitted from the first semiconductor laser to the first object lens 27 and for guiding return light beams reflected from the first optical disc 210 and incident through the first object lens 27 to light detector constituted by photo-detector, etc., and a second optical system 52 for guiding second light beams emitted from the second semiconductor laser to the second object lens 28, and for guiding return light beams reflected from the second optical disc 211 and incident through the second object lens 28 to light detector constituted by photo-detector, etc.

The first optical system 51 is constituted by optical parts such as collimator lens for allowing light beams emitted as divergent light from the first semiconductor laser to be parallel light, beam splitter for carrying out separation between light beams emitted from the first semiconductor laser and return light beams reflected from the first optical disc 210, reflection mirror for reflecting light beams emitted from the first semiconductor laser which have been passed through the beam splitter so as to allow them to be incident to the first object lens 27, and for reflecting return light beams reflected from the first optical disc 210 and incident through the first object lens 27 so as to allow them to be incident to the beam splitter, and the like.

Moreover, the second optical system 52 is constituted, in a manner similar to the above, by optical parts such as collimator lens for allowing light beams emitted as a divergent light from the second semiconductor laser to be parallel light, beam splitter for carrying out separation between light beams emitted from the second semiconductor laser and return light beams reflected from the second optical disc 211, reflection mirror for reflecting light beams emitted from the second semiconductor laser which have been transmitted through the beam splitter so as to allow them to be incident to the second object lens 28, and for reflecting return light beams reflected from the second optical disc 211 and incident through the second object lens 28 so as to allow them to be incident to the beam splitter, and the like.

As shown in FIG. 6, the optical pick-up device 21 constituted as described above is attached on the base 23 in the state supported by the guide shaft 25a and the drive shaft 25b in such a manner that line connecting respective optical axes $P_1$, $P_2$ of the first and second object lenses 27, 28 is in parallel to tangential line L of recording track $T_1$ formed in a concentrical form or in a spiral form with the rotation center $O_1$ being as center at the first or second optical disc 210 or 211 loaded on the disc table 24. At this time, the optical pick-up device 21 is attached on the base 23 in such a manner that the optical axis $P_2$ of the second object lens 28 used for recording and/or reproduction of the second optical disc 211 in which higher density recording has been realized is located on the line M passing through the rotation center $O_1$ of the first or second optical disc 210 or 211 on the disc table 24.

As described above, since the optical pick-up device 21 of the second embodiment is disposed on the base 23 in such a manner that the optical axis $P_2$ of the second object lens 28 is located on line M passing through the rotation center $O_1$ of the first or second optical disc 210, 211, the first object lens 27 is placed so that the optical axis $P_1$ placed at the position shifted from onto the line M passing through the rotation center $O_1$ of the first or second optical disc 210 or 211. For this reason, in the case where the optical pick-up device 21 is caused to undergo feed operation in the direction indicated by arrow $X_1$ in FIG. 5 to carry out recording and/or reproduction of information signals with respect to the first optical disc 210 by using the first object lens 27, the optical axis $P_1$ of the first object lens 27 is shifted (deviates) from the center of the recording track of the first optical disc 210. For this reason, in the case of carrying out recording and/or reproduction of information signals with respect to the first optical disc 210 by using the object lens 27, the so-called push-pull method is employed in tracking control to conduct a control such that light beam irradiated onto the first optical disc 210 through the first object lens 27 is located on the recording track.

This push-pull method is a method in which single light beam is used to obtain tracking error signal, and is a method of detecting single return light beam reflected from the first optical disc 210 by bisected light (photo) detector to determine difference between detection outputs obtained from the divided respective light detectors (detector elements) to thereby obtain tracking error signal which is deviation component with respect to the recording track of light beam.

As this push-pull method, there may be employed a method as described in U.S. Pat. No. 4,491,940.

On the other hand, the second object lens 28 is adapted so that its optical axis $P_2$ is positioned on the line M passing through the rotation center $O_1$ of the first or second optical disc 210 or 211. For this reason, in the case of carrying out recording and/or reproduction of information signals with respect to the second optical disc 211 by using the second object lens 28, the optical axis $P_2$ of the second object lens 28 is positioned on the center of the recording track of the second optical disc 211. In view of the above, in the tracking control in the case of carrying out recording and/or reproduction of information signals with respect to the second optical disc 211 by using the second object lens 28, three-beam method may be used in addition to the above-described push-pull method.

This three-beam method is a method of dividing single light beam emitted from the second semiconductor laser into single main beam and two sub-beams by using diffraction grating, etc. to irradiate two sub-beams at portions before and after the main beam irradiated onto the center of the recording track to detect sub-beams disposed before and after the main beam by respective light detectors to determine difference between detection outputs obtained from the respective light detectors to thereby obtain tracking error signal which is deviation component with respect to the recording track of the main beam.

As a device for obtaining tracking error signal by using the three-beam method, there may be used a device as described in the Japanese Patent Publication No. 13123/1978.

Further, in the optical pick-up device 21 of the second embodiment, in the focus control to conduct a drive control of the first or second object lens 27 or 28 in the optical axis direction thereof so that light beams emitted from the first or second light source are focused on the signal recording surface of the first or second optical disc 210 or 211, the so-called astigmatism method is used. This astigmatism method is a method of detecting return light beam reflected from the first or second optical disc 210 or 211 by quadrisected light detector through, e.g., cylindrical lens to determine sum of detection outputs obtained from the respective detectors and/or difference therebetween to thereby obtain focus error signal which in-focus deviation component with respect to the signal recording surface of light beam.

As a device for obtaining focus error signal by this astigmatism method, there is used a device as described in the U.S. Pat. No. 4,023,033.

The tracking error signal obtained by a detection method as described above is delivered to tracking drive coils 42*a*, 42*b* and 43*a*, 43*b* of the electromagnetic drive mechanism 35. Thus, tracking control of the first and second object lenses 27, 28 is carried out. Moreover, the focus error signal is delivered to the focusing drive coils 40, 41. Thus, focusing control of the first and second object lenses 27, 28 is carried out.

The optical pick-up device 21 is adapted so that light source used is switched in dependency upon the first or second optical disc 210 or 211 loaded into the optical disc recording and/or reproducing apparatus. For this reason, in the optical disc recording and/or reproducing apparatus using this optical pick-up device 21, there is provided a discrimination mechanism for discriminating whether loaded optical disc is the first optical disc 210 or the second optical disc 211 to switch ON/OFF of the light source, i.e., drive of first or second semiconductor laser in dependency upon the discrimination result.

Since discrimination means described in the specification and the drawings of the U.S. patent application Ser. No. 08/694,544 is used as the above-mentioned discrimination mechanism, the description of the specification and the drawings is applied thereto and their detailed description is omitted.

For better understanding of this discrimination mechanism, outline thereof will be described below. This discrimination mechanism serves to carry out discrimination between the first and second optical discs 210, 211 in which track pitches are different from each other by utilizing the fact that when light is irradiated onto the first or second optical disc 210 or 211 loaded into the optical disc recording and/or reproducing apparatus, diffusion angle of diffracted light of the 1-st order diffracted light or diffracted light of the order higher than that which are diffracted by recording tracks formed at the first or second optical disc 210, 211 varies in dependency upon the pitch of the recording track, and comprises light source such as LED, etc. for irradiating light onto the first or second optical disc 210 or 211, and two light receiving elements corresponding to the first and second optical discs 210, 211 for receiving either one of rays of diffracted light of the 1-st diffracted light and diffracted light of the order higher than that which are diffracted by recording tracks formed at the first or second optical disc 210 or 211. These light receiving elements are disposed at the positions corresponding to diffusion angles of rays of diffracted light corresponding to the pitches of the recording tracks respectively formed at the first and second optical discs 210, 211 and serve to discriminate by the light receiving signal whether corresponding optical disc is the first optical disc 210 or the second optical disc 211.

In this example, the pitch of the recording track of the second optical disc 211 in which high density recording has been realized is sufficiently smaller than that of the first optical disc 210.

The optical disc recording and/or reproducing apparatus using the optical pick-up device 21 constituted as described above is adapted so that the first and second object lenses 27, 28 are arranged in parallel in the direction of the tangential line L of recording tracks of the first or second optical disc 210 or 211, whereby, in reproducing information signals from any one of the first and second optical discs 210, 211 in which thicknesses of their disc bases (substrates) are different from each other, the first and second object lenses 27, 28 are driven in the focusing direction and in the tracking direction by the common drive mechanism without switching the reference position. For this reason, the configuration of the optical pick-up device 21 can be simplified, and miniaturization and light weight of the optical pick-up device 21 can be realized.

Moreover, in accordance with the optical pick-up device 21, it is possible to independently use the first or second semiconductor laser, the first or second optical system 51, 52 and the first or second object lens 27, 28 in correspondence with any one of the first and second optical discs 210, 211 in which thicknesses of their disc substrates are different from each other. Accordingly, it is possible to use the components respectively optimum in correspondence with the first and second optical discs 210, 211. Thus, optimization can be made also with respect to optical discs having high wavelength dependency.

Accordingly, also with respect to the first and second object lenses 27, 28, there are used object lenses of numerical apertures NA which are respectively in conformity with the first and second optical discs 210, 211.

Figure 7:
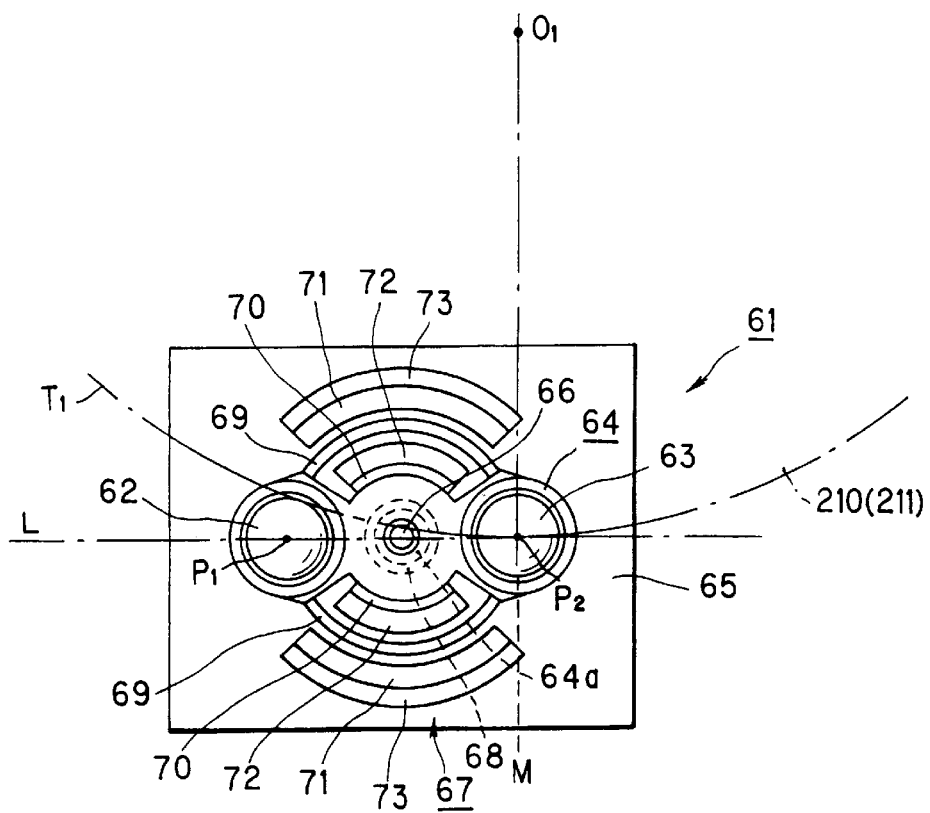
FIG. 7 is a plan view showing an optical pick-up device according to a third embodiment of this invention.

An optical pick-up device 61 of the third embodiment according to this invention will now be described. This optical pick-up device 61 is also used in, e.g., optical disc recording and/or reproducing apparatus using the previously described first and second optical discs 210, 211 as recording medium, and comprises, as shown in FIG. 7, a first object lens 62 used at the time of reading out information signals recorded on the first optical disc 210, a second object lens 63 used at the time of reading out information signals recorded on the second optical disc 211, and a bobbin 64 on which these first and second object lenses 62, 63 are attached. This bobbin 64 is slidable, with respect to a support shaft 66 of which central portion is vertically provided on a supporting base (substrate) 65, in the axial direction of the support shaft 66, and is rotatably supported in a direction around the axis of the support shaft 66. In addition, the first and second object lenses 62, 63 are attached at bilateral symmetrical positions with the support shaft 66 of the bobbin 64 being as center so that respective optical axes $P_1$, $P_2$ are in parallel to each other.

With respect to the first and second object lenses 62, 63, the bobbin 64 is slid in the axial direction of the support shaft 66, whereby focusing control with respect to the first or second optical disc 210 or 211 is carried out. As a result, the bobbin 64 is rotated with the support shaft 66 being as center. Thus, tracking control with respect to recording tracks of the first or second optical disc 210 or 211 is carried out.

Slide in the axial direction of the support shaft 66 of the bobbin 64 and rotation with the support shaft 66 being as center are carried out by an electromagnetic drive mechanism 67. This electromagnetic drive mechanism 67 is composed of a focusing drive coil 68 wound on the circumferential surface of a tubular portion 64a inserted through the support shaft 66 of the bobbin 64, a pair of tracking drive coils 69, 69 disposed on the outer circumferential surface of the bobbin 64, a pair of focusing magnets 70, 70 disposed in a manner opposite to the focusing drive coil 68, a pair of tracking magnets 71, 71 disposed in a manner opposite to respective tracking drive coils 69, 69, focusing yokes 72, 72 formed in a rising manner (hereinafter simply referred to as "rising-formed" as occasion may demand) from the supporting base (substrate) 65 formed by magnetic material, which respectively support these magnets 71, 71, and tracking yokes 73, 73.

Moreover, also in the optical pick-up device 61 of the third embodiment, similarly to the above-described optical pick-up device 21 of the second embodiment, within the optical block disposed at the lower surface side of the supporting base 65 on which the bobbin 64 on which the first and second object lenses 62, 63 are attached is movably supported, there are included first semiconductor laser serving as a first light source to emit first light beams, which is used for carrying out recording and/or reproduction of the first optical disc 210, and second semiconductor laser serving as a second light source to emit second light beams, which is used for carrying out recording and/or reproduction of the second optical disc 211 in which high density recording of information signals has been realized.

In this case, as the first semiconductor laser, there is used semiconductor laser adapted to emit light beams of wavelength of 780±10 nm. As the second semiconductor laser, there is used semiconductor laser adapted to emit light beams of wavelength of 680 nm or less.

Within the optical block, there are provided a first optical system for guiding first light beams emitted from the first semiconductor laser to the first object lens 62 and for guiding return light beams reflected from the first optical disc 210 and incident through the first object lens 62 to light detector constituted by photo-detector, etc., and a second optical system for guiding second light beams emitted from the second semiconductor laser to the second object lens 63 and for guiding return light beams reflected from the second optical disc 211 and incident through the second object lens 63 to light detector constituted by photo-detector, etc.

Since the first and second optical systems provided at this optical pick-up device 61 is of the configuration similar to those provided at the previously described optical pick-up device, detailed explanation is omitted.

As shown in FIG. 7, the optical pick-up device 61 constituted as described above is disposed within the player body in such a manner that line connecting respective optical axes $P_1$, $P_2$ of the first and second object lenses 62, 63 is in parallel to tangential line L of recording track $T_1$ formed in a concentrical form or in a spiral form, with the rotation center $O_1$ being as center, at the first or second optical disc 210 or 211 loaded on the disc table of the optical disc recording and/or reproducing apparatus. At this time, the optical pick-up device 61 is disposed within the player body in such a manner that the optical axis $P_2$ of the second object lens 63 used for recording and/or reproduction of the second optical disc 211 in which high density recording has been realized is located on the line M passing through the rotation center $O_1$ of the first or second optical disc 210 or 211 on the disc table.

Also in this optical pick-up device 61, similarly to the previously described optical pick-up device 21 of the second embodiment, in the case where the first object lens 62 is used to carry out recording and/or reproduction of information signals with respect to the first optical disc 210, tracking control using the push-pull method is carried out. In the tracking control in the case where the second object lens 63 is used to carry out recording and/or reproduction of information signals with respect to the second optical disc 211, the three-beam method is used in addition to the above-described push-pull method. Moreover, in the focus control to drive and control the first or second object lens 62 or 63 in the optical axis direction thereof, the so-called astigmatism method is used.

In addition, in the optical disc recording and/or reproducing apparatus using this optical pick-up device 61, similarly to the previously described optical disc recording and/or reproducing apparatus, there is provided a discrimination mechanism for discriminating whether optical disc to be loaded is either the first optical disc 210 or the second optical disc 211 to switch, in dependency upon the discrimination result, ON/OFF of the light source used, i.e., drive of the first or second semiconductor laser.

Since the optical pick-up device 61 constituted as described above is adapted so that the first object lens 62 and the second object lens 63 are disposed at positions symmetrical with the support shaft 66 being as center, one of the first and second object lenses 62, 63 acts as also weight for balance which is so called counter balance with respect to the other. For this reason, it becomes unnecessary for this optical pick-up device 61 to provide counter-balance with respect to the first and second object lenses 62, 63. Thus, the entirety of the device can be small-sized and can be lightened (in weight).

An optical pick-up device 81 of the fourth embodiment according to this invention will now be described with reference to FIG. 8. Since this optical pick-up device 81 has configuration substantially similar to that of the previously described optical pick-up device of the second embodiment shown in FIGS. 5 and 6, the same reference numerals are respectively attached to the same members and the detailed description thereof will be omitted.

Figure 8:
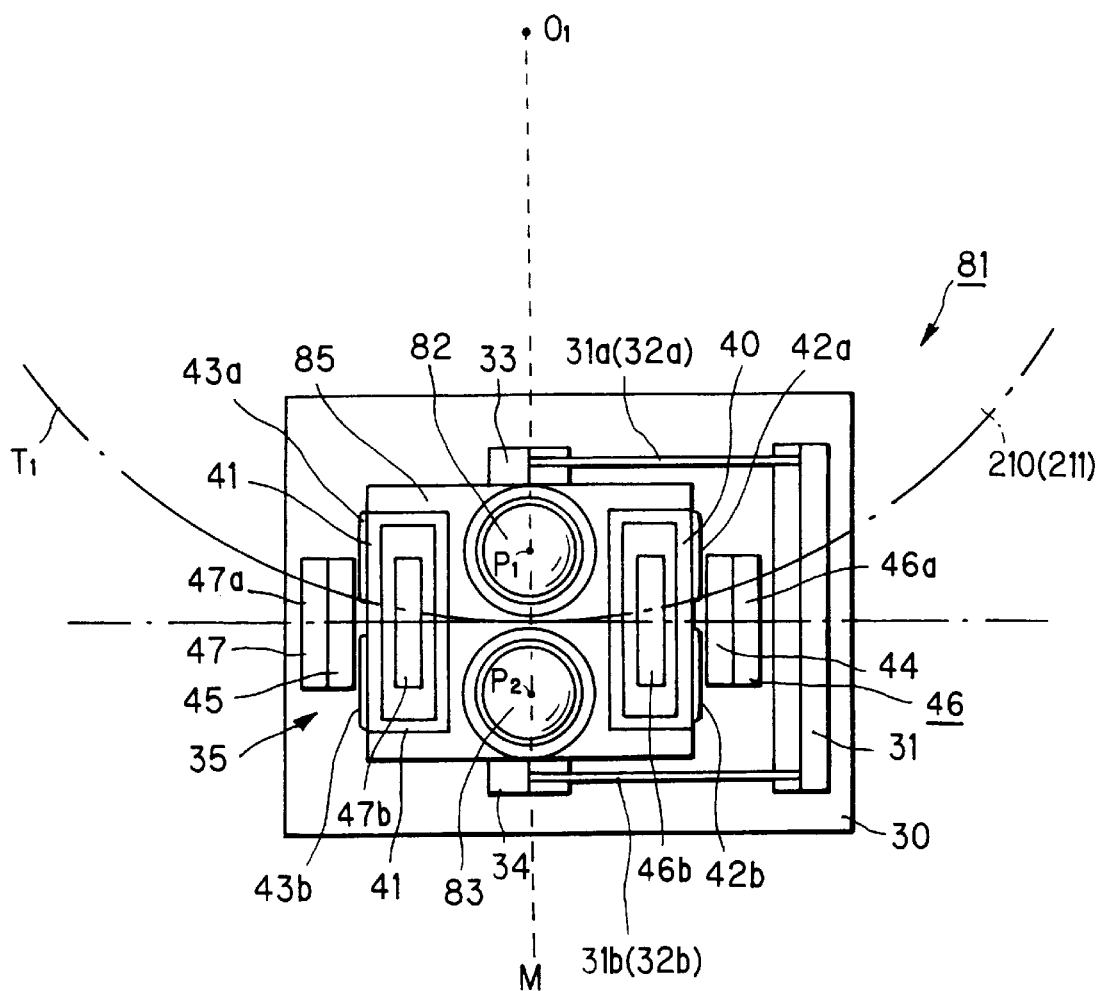
FIG. 8 is a plan view showing an optical pick-up device according to a fourth embodiment of this invention.

As shown in FIG. 8, this optical pick-up device 81 is attached on a canti-lever supported bobbin 85 in such a manner that respective optical axes $P_1$, $P_2$ of the first object lens 82 and the second object lens 83 are located on the line M passing through the rotation center $O_1$ of the first or second optical disc 210 or 211 loaded on the disc table of the optical disc recording and/or reproducing apparatus, i.e., are juxtaposed in the tracking direction of the first or second optical disc 210 or 211.

Since the optical pick-up device 81 constituted in this way permits respective optical axes $P_1$, $P_2$ of the first object lens 82 and the second object lens 83 to be located at the center of recording track of the first or second optical disc 210 or 211, even in the case were either object lens 82 or object lens 83 is used, it is possible to scan the recording tracks by light beams with high accuracy. Accordingly, recording/reproduction of information signals can be carried out with satisfactory recording/reproduction characteristic at all times.

While the above-described respective optical pick-up devices are caused to be of the structure comprising the first and second object lenses in correspondence with CD and DVD, they may be caused to be of the structure comprising third object lens in order to cope with any other optical disc as occasion demands. This optical pick-up device is caused to be, e.g., of structure in which the first object lens is disposed in the state positioned on the line passing through the center of the optical disc, the first to third object lenses are juxtaposed in the tangential direction of the recording tracks of the optical disc, and the second and third object lenses are respectively disposed at symmetrical positions with respect to the optical axis of the first object lens.

Industrial Applicability

As described above, the optical pick-up device according to this invention comprises first object lens, second object lens having numerical aperture different from numerical aperture of the first object lens, bobbin on which the first and second object lenses are attached, and drive mechanism for moving the bobbin in the first direction in parallel to the optical axes of the first and second object lenses and in the second direction perpendicular to the optical axes of the first and second object lenses to selectively use the first and second object lenses, thereby permitting recording and/or reproduction of at least two kinds of optical discs different in kind. Accordingly, it is possible to carry out, by using single optical pick-up device, recording and/or reproduction of information signals with respect to optical discs of plural specifications.

Particularly, since one object lens is adapted so that its optical axis is caused to be positioned on the line passing through the center of the optical disc, even if corresponding optical disc is optical disc having small track pitch which permits high density recording, it becomes possible to carry out recording and/or reproduction of information signals with high accuracy.

In addition, since such approach is employed to allow the first and second object lenses to undergo drive control in the focusing direction and/or in the tracking direction by the common drive mechanism, miniaturization and thin thickness structure of the device itself can be realized.

We claim:

1. An optical pick-up device for recording and/or reproduction of at least two kinds of optical discs, the optical pick-up device comprising:

a first object lens;

a second object lens;

a bobbin attached in such a manner that respective optical axes of the first and second object lenses are in parallel to each other, and either one of the first and second object lenses is disposed on a line passing through the center of an optical disc; and a drive mechanism for moving the bobbin in a first direction in parallel to the optical axes of the first and second object lenses and in a second direction perpendicular to the optical axes, wherein the first and second object lenses are attached on the bobbin such that when the object lens disposed on the line is disposed at the innermost circumference of a first kind of optical disc, that object lens is located at a read position of the first kind of optical disc and the other object lens is disposed at a position corresponding to the read position of a second kind of optical disc.

2. The optical pick-up device of claim 1, wherein the first and second object lenses are attached on the bobbin along a tangential line direction of tracks of the optical disc.

3. An optical pick-up device as set forth in claim 2, wherein the drive mechanism comprises at least one elastic supporting member for movably supporting the bobbin in the first and second directions, a fixed portion on which the end portion of the elastic supporting member is attached, plural coils provided at either one of the bobbin and the fixed portion, and at least one magnet provided at the other and opposite to the plural coils.

4. An optical pick-up device as set forth in claim 3, wherein the device further comprises a first light source, a first optical system for guiding light beams from the first light source to the first object lens, a second light source for emitting light beams having wavelength different from wavelength of light beams emitted from the first light source, and a second optical system for guiding light beams from the second light source to the second object lens.

5. An optical pick-up device as set forth in claim 4, wherein numerical aperture of the first object lens and numerical aperture of the second object lens are different from each other.

6. The optical pick-up device of claim 1, wherein the first and second object lenses are attached on the bobbin so that they are respectively positioned on a line passing through the center of the optical disc.

7. An optical pick-up device as set forth in claim 6, wherein the drive mechanism comprises at least one elastic supporting member for movably supporting the bobbin in the first and second directions, a fixed portion on which the end portion of the elastic supporting member is attached, plural coils provided at either one of the bobbin and the fixed portion, and at least one magnet provided at the other and opposite to the plural coils.

8. An optical pick-up device as set forth in claim 7, wherein the device further comprises a first light source, a first optical system for guiding light beams from the first light source to the first object lens, a second light source for emitting light beams having wavelength different from wavelength of light beams emitted from the first light source, and a second optical system for guiding light beams from the second light source to the second object lens.

9. An optical pick-up device as set forth in claim 8, wherein numerical aperture of the first object lens and numerical aperture of the second object lens are different from each other.

10. An optical pick-up device for recording and/or reproduction of at least two kinds of optical discs, the optical pick-up device comprising:

a first object lens;

a second object lens having a numerical aperture different from a numerical aperture of the first object lens;

a bobbin attached in such a manner that respective optical axes of the first and second object lenses are in parallel to each other, and at least one of the first and second object lenses is located at a starting position of an optical disc when the optical pick-up device is positioned at the innermost circumference of the optical disc; and a drive mechanism for moving the bobbin in a first direction in parallel to the optical axes of the first and second object lenses and in a second direction perpendicular to the optical axes, wherein the first and second object lenses are attached on the bobbin in such a manner that when one object lens is located is located at a starting position of an optical disc of a first kind when the optical pick-up device is positioned at the innermost circumference of the optical disc of a first kind, the other object lens is located at a position corresponding to the starting position of an optical disc of a second kind.

11. The optical pick-up device of claim 10, wherein the first and second object lenses are attached on the bobbin in such a manner that when one object lens disposed on a line passing through the center of the optical disc is located at a read starting position of one kind of optical disc, the other object lens is located at a read starting position of another kind of optical disc.

12. The optical pick-up device of claim 10, wherein either one of the first and second object lenses is disposed on a line passing through the center of the optical disc.

13. The optical pick-up device of claim 10, wherein the drive mechanism comprises at least one elastic supporting member for movably supporting the bobbin in the first and second directions, a fixed portion on which the end portion of the elastic supporting member is attached, plural coils provided at either one of the bobbin and the fixed portion, and at least one magnet provided at the other and opposite to the plural coils.

14. An optical pick-up device as set forth in claim 13, wherein the device further comprises a first light source, a first optical system for guiding light beams from the first light source to the first object lens, a second light source for emitting light beams having wavelength different from wavelength of light beams emitted from the first light source, and a second optical system for guiding light beams from the second light source to the second object lens.

15. An optical pick-up device used for recording and/or reproduction of at least two kinds of optical discs having thicknesses different from each other, the optical pick-up device comprising:

a first object lens for irradiating light beams from a first light source onto either one of the two kinds of optical discs;

a second object lens for irradiating light beams from a second light source onto the other of the two kinds of optical discs;

a bobbin attached in such a manner that respective optical axes of the first and second object lenses are in parallel to each other, and either one of the first and second object lenses is disposed on a line passing through the center of an optical disc; and a drive mechanism for moving the bobbin in a first direction in parallel to the optical axes of the first and second object lenses and in a second direction perpendicular to the optical axes, wherein the first and second object lenses are attached on the bobbin such that when the object lens disposed on the line is disposed at the innermost circumference of a first kind of optical disc, that object lens is located at a read position of the first kind of optical disc and the other object lens is disposed at a position corresponding to the read position of a second kind of optical disc.

16. An optical pick-up device as set forth in claim 15, wherein the first and second object lenses are attached on the bobbin along a tangential direction of tracks of the optical disc.

17. An optical pick-up device as set forth in claim 16, wherein the drive mechanism comprises at least one elastic supporting member for movably supporting the bobbin in the first and second directions, a fixed portion on which the end portion of the elastic supporting member is attached, plural coils provided at either one of the bobbin and the fixed portion, and at least one magnet provided at the other and opposite to the plural coils.

18. An optical pick-up device as set forth in claim 17, wherein numerical aperture of the first object lens and numerical aperture of the second object lens are different from each other.

19. An optical pick-up device as set forth in claim 15, wherein the first and second object lenses are attached on the bobbin so that they are respectively positioned on a line passing through the center of the optical disc.

20. An optical pick-up device as set forth in claim 19, wherein the drive mechanism comprises at least one elastic supporting member for movably supporting the bobbin in the first and second directions, a fixed portion on which the end portion of the elastic supporting member is attached, plural coils provided at either one of the bobbin and the fixed portion, and at least one magnet provided at the other and opposite to the plural coils.

21. An optical pick-up device as set forth in claim 20, wherein numerical aperture of the first object lens and numerical aperture of the second object lens are different from each other.

22. A recording and/or reproducing apparatus for optical discs, which is adapted for carrying out recording and/or reproduction of at least two kinds of optical discs having thicknesses different from each other, the apparatus comprising:

an optical pick-up device comprising a first object lens for irradiating light beams from a first light source onto either one of the two kinds of optical discs, a second object lens for irradiating light beams from a second light source onto the other of the two kinds of optical discs; a bobbin on which the first and second object lenses are attached in such a manner that respective optical axes thereof are in parallel to each other, and either one of the first and second object lenses is positioned on a line passing through the center of an optical disc, and a drive mechanism for moving the bobbin in a first direction in parallel to the optical axes of the first and second object lenses and in a second direction perpendicular to the optical axes; and a discrimination mechanism for discriminating the kind of optical disc loaded into the recording and/or reproducing apparatus to carry out switching between the first light source and the second light source on the basis of the discrimination mechanism's discrimination result, wherein the first and second object lenses are attached on the bobbin such that when the object lens disposed on the line is disposed at the innermost circumference of a first kind of optical disc, that object lens is located at a read position of the optical disc and the other object lens is disposed at a position corresponding to the read position of a second kind of optical disc.

23. The recording and/or reproducing apparatus of claim 22, wherein the first and second object lenses are attached on the bobbin along a tangential line direction of tracks of the optical disc.

24. The recording and/or reproducing apparatus of claim 23, wherein the drive mechanism comprises at least one elastic supporting member for movably supporting the bobbin in the first and second directions, a fixed portion on which the end portion of the elastic supporting member is attached, plural coils provided at either one of the bobbin and the fixed portion, and at least one magnet provided at the other and opposite to the plural coils.

25. The recording and/or reproducing apparatus of claim 24, wherein the numerical aperture of the first object lens and the numerical aperture of the second object lens are different from each other.

26. The recording and/or reproducing apparatus of claim 23, wherein the first and second object lenses are attached on the bobbin so that they are respectively positioned on a line passing through the center of the optical disc.

27. The recording and/or reproducing apparatus of claim 26, wherein the drive mechanism comprises at least one elastic supporting member for movably supporting the bobbin in the first and second directions, a fixed portion on which the end portion of the elastic supporting member is attached, plural coils provided at either one of the bobbin and the fixed portion, and at least one magnet provided at the other and opposite to the plural coils.

28. The recording and/or reproducing apparatus of claim 27, wherein the numerical aperture of the first object lens and the numerical aperture of the second object lens are different from each other.

* * * * *